(12) United States Patent
Victor

(10) Patent No.: US 6,501,022 B2
(45) Date of Patent: Dec. 31, 2002

(54) FACE PLATE LOCKING SYSTEM AND METHOD THEREFOR

(76) Inventor: Simeon Luke Victor, 1609 Clark Point Ct., Las Vegas, NV (US) 89134

( * ) Notice: Subject to any disclaimer, the term of this patent is extended or adjusted under 35 U.S.C. 154(b) by 0 days.

(21) Appl. No.: 09/849,701

(22) Filed: May 7, 2001

(65) Prior Publication Data

US 2002/0162682 A1 Nov. 7, 2002

(51) Int. Cl.[7] .................................................. H02G 3/14
(52) U.S. Cl. ........................ 174/66; 174/67; 220/241; 220/242; 411/549; 411/550
(58) Field of Search ..................... 174/66, 67; 220/241, 220/242; 411/549, 550, 551, 552, 553; 70/57

(56) References Cited

U.S. PATENT DOCUMENTS

| | | | |
|---|---|---|---|
| 2,987,909 A | * | 6/1961 | Shlank ..................... 174/67 X |
| 3,197,549 A | | 7/1965 | Good |
| 3,745,664 A | | 7/1973 | Altseimer |
| 3,814,834 A | | 6/1974 | Glader |
| 3,885,852 A | | 5/1975 | Grove |
| 4,098,423 A | | 7/1978 | Marrero |
| 4,398,073 A | | 8/1983 | Botz et al. |
| 4,488,764 A | * | 12/1984 | Pfenning et al. ............ 70/57 X |
| 4,593,541 A | * | 6/1986 | Hollis ............................. 70/57 |
| 4,733,330 A | | 3/1988 | Tanaka et al. |
| 5,189,259 A | | 2/1993 | Carson et al. |
| 5,456,373 A | | 10/1995 | Ford |
| 5,524,330 A | | 6/1996 | Alberini |
| 5,604,661 A | | 2/1997 | Nagao |
| 5,675,125 A | | 10/1997 | Hollinger |
| 5,895,888 A | | 4/1999 | Arenas et al. |
| 5,912,432 A | * | 6/1999 | Thomas ....................... 174/67 |

* cited by examiner

Primary Examiner—Chau N. Nguyen
Assistant Examiner—Dhiru R Patel
(74) Attorney, Agent, or Firm—Jeffrey D. Moy; Harry M. Weiss; Weiss, Moy & Harris, P.C.

(57) ABSTRACT

A system which allows for a face plate to be locked to an electrical box. The system has a male connector which is rotatably coupled to the face plate. A female receptacle receives the male connector. A partial turn of the male connector will lock and unlock the face plate to the electrical box.

14 Claims, 2 Drawing Sheets

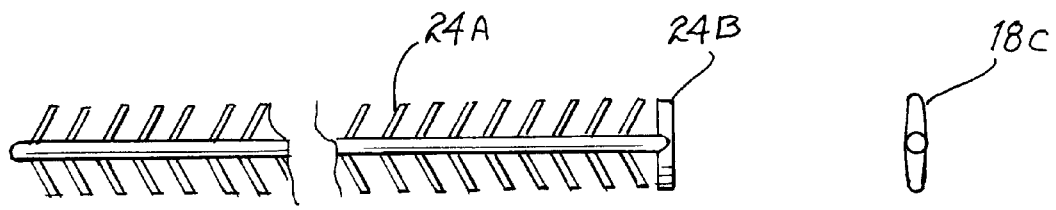
FIG. 5
FIG. 6
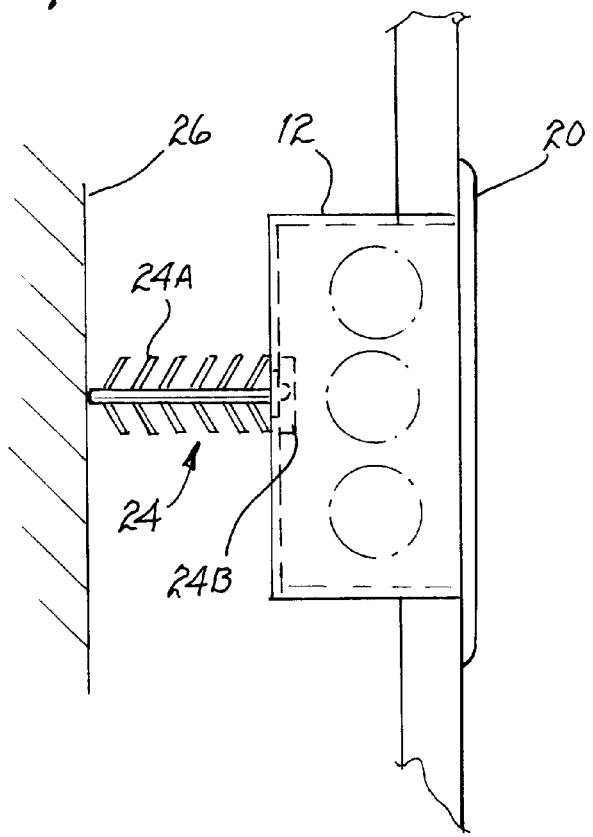
FIG. 7

FACE PLATE LOCKING SYSTEM AND METHOD THEREFOR

BACKGROUND OF THE INVENTION

1. Field of the Invention

This invention relates to electrical accessories and, more specifically, to an improved system and method for securing a faceplate to an electrical box such as an outlet box or switch box and the like.

2. Description of the Prior Art

All homes and businesses have electrical boxes like outlet boxes, switch boxes, cable outlet boxes, phone outlet boxes, and the like built into the walls throughout the structure. Generally, these boxes are covered with a faceplate. The faceplate is used to cover the box and to prevent individuals from touching the wiring held within the box. The face plate is generally connected to the box or to the device (i.e., electrical outlet, switch, etc.) positioned in the box. The face plate is generally connected to the box or to the device via one or more screws.

While the present system does work, there are several problems associated with it. First, in the construction of a new home or business, there will be multiple electrical boxes which are installed in the walls of the buildings. Each of these electrical boxes need to be covered by a face plate. This requires the electrician to screw in a face plate on each electrical box which is extremely time consuming. Second, many times when a face plate is removed, people will have a tendency to misplace the screw. Thus, one may not be able to reinstall the face plate since the screw is missing. Third, when installing a face plate, many people have a tendency to over tighten the screw to the face plate. When one over tightens the screw, it has a tendency to crack the face plate.

Therefore, a need existed to provide a new system for installing face plates to electrical boxes. The new system must allow for the quick installation and removal of the face plate on the electrical box. The new system must further prevent parts from being misplaced or lost. The new system must further prevent the over tightening of the face plate to the electrical box thereby preventing cracking of the face plate.

SUMMARY OF THE INVENTION

In accordance with one embodiment of the present invention, it is an object of the present invention to provide a new system for installing face plates to electrical boxes.

It is another object of the present invention to provide a new system for installing face plates to electrical boxes that allows for the quick installation and removal of the face plate on the electrical box.

It is still another object of the present invention to provide a new system for installing face plates to electrical boxes that prevents parts from being misplaced or lost.

It is still another embodiment of the present invention to provide a new system for installing face plates to electrical boxes that prevents the over tightening of the face plate to the electrical box thereby preventing cracking of the face plate.

BRIEF DESCRIPTION OF THE PREFERRED EMBODIMENTS

In accordance with one embodiment of the present invention, a system for locking a face plate to an electrical box is disclosed. The system uses a male connector rotatably coupled to the face plate. A female receptacle is used to receive the male connector. A partial turn of the male connector will lock and unlock the face plate to the electrical box.

In accordance with another embodiment of the present invention, a housing for storing electrical components is disclosed. The housing has an electrical box. A face plate is used to cover the electrical box. A locking mechanism is used for coupling the face plate to the electrical box wherein the locking mechanism uses a partial turn to lock and unlock the locking mechanism.

In accordance with another embodiment of the present invention, a method for securing a face plate to an electrical box is disclosed. The method comprises the steps of: providing a male connector wherein the male connector comprises: a rod; barbed members coupled to the rod; a slotted head coupled to a first end of the rod; and a locking member coupled to a second end opposite of the first end of the rod; providing a female receptacle which receives the male connector; inserting the male connector through an opening in the face plate wherein the barbed members prevent the male connector from being removed from the opening but allowing the male connector to rotate in the opening; inserting the male connector coupled to the face plate in the female receptacle; and rotating the slotted head of the male connector.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

FIG. 5 a side view of the barbed member used in the face plate locking system of the present invention.

FIG. 6 is a rear view of the locking nut used in the locking mechanism of the face plate locking system of the present invention.

FIG. 7 is a side view of the supporting member used in the face plate locking system of the present invention.

DETAILED DESCRIPTION OF THE PREFERRED EMBODIMENT

Figure 1:
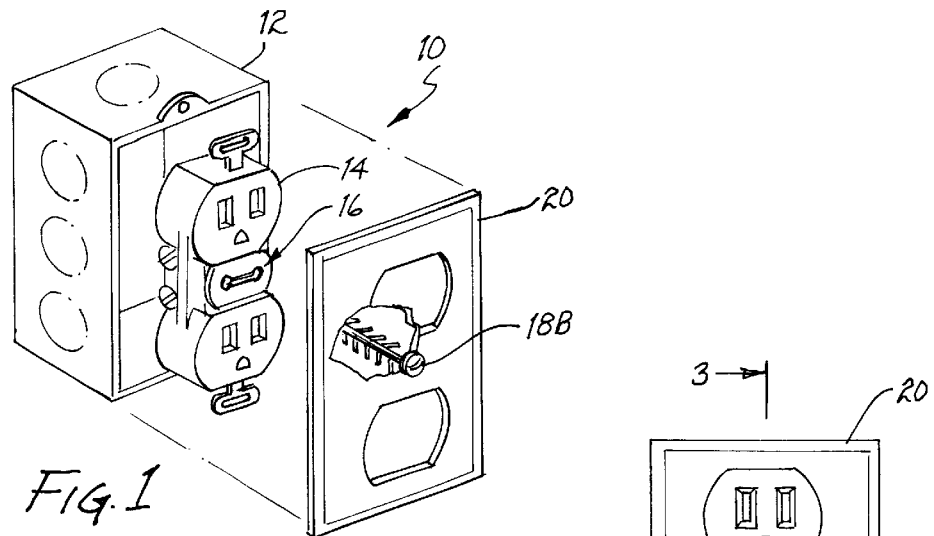
FIG. 1 is an elevated perspective view of the face plate locking system of the present invention.
Figure 2:
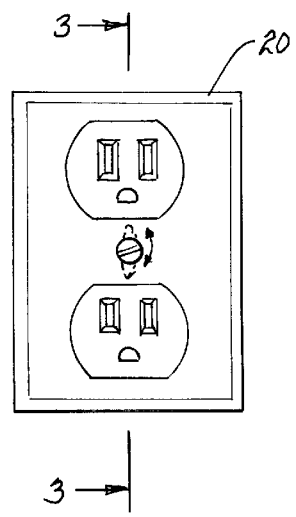
FIG. 2 is a front view of the face plate locking system of the present invention.
Figure 3:
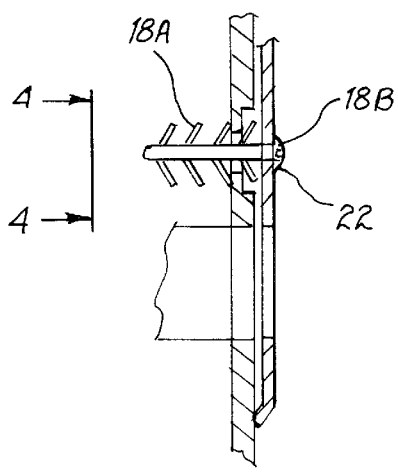
FIG. 3 is a cross-sectional view of the face plate locking system taken along lines 3—3 of FIG. 2.

Referring to the Figures a face plate locking system 10 (hereinafter system 10) is shown. The system 10 will use a standard electrical box 12. The electrical box 12 may be an electrical outlet box, a electrical switch box, a cable outlet box, a phone jack box, an electrical junction box, and boxes of a similar nature. The electrical box 12 is generally coupled to the frame of the house or building in which the electrical box 12 is installed.

Generally, some type of electrical component will be held within the electrical box 12. For example, an electrical receptacle, a telephone jack, a cable jack, and the like will be coupled to the electrical box 12. However, it should be noted that the system 10 may be used to cover an electrical box 12 that does not have a component held within the electrical box 12.

In the embodiment depicted in the Figures, the electrical box 12 is used to hold a dual plug receptacle 14. However, as already stated, the other types of components or no component at all may be in the electrical box 12. The standard threaded opening which is used to secure the face plate with a screw has been replaced. The dual plug receptacle 14 now has a female receptacle 16 which forms part of the locking mechanism for the system 10. The female receptacle 16 will have a channel 16A. On each side of the channel 16A will be a rounded open end 16B. It should be noted that the female receptacle 16 is shown in the center of the dual plug receptacle 14. However, the female receptacle 16 could be positioned in other locations. For example, the female receptacle could be located at the top and bottom of the dual plug receptacle 14. The female receptacle 16 may also be positioned on the electrical box 12 itself.

The system 10 will further use a male connector 18. The male connector 18 will have a barbed member 18A. On one end of the barbed member 18A is a slotted head 18B. On the other end of the barbed member 18A is a locking member 18C. In accordance with one embodiment of the present invention, the slot in the slotted head 18B is parallel with the barbs of the barbed member 18A and the locking member 18B. By having the slot of the slotted head 18B parallel with the barbs of the barbed member 18A and the locking member 18B, one will be able to tell if the system 10 is locked or unlocked. This will be described below.

The system 10 will further have a face plate 20. The face plate 20 will have one or more openings 22. The openings 22 are used to allow the male connector 18 to be placed through the face plate 20 and into the female connector 16 thereby locking the face plate 20 in position. The opening 22 is large enough to allow the barbed member 18A to be placed through the opening 22 but small enough so that the slotted head 18B will not be able to fit through the opening 22.

The system 10 may further have a support member 24. The support member 24 is coupled to the electrical box 12. The support member 23 is used to support the electrical box 12 against a support 26 in the wall where the electrical box 12 is being installed. This is most clearly shown in FIG. 7. Th support member 24 has a barbed member 24A and a head 24B located on one end of the barbed member 24A.

OPERATION

To install the support member 24, one must measure the distance between the support 26 and the back of the electrical box 12. The support member 24 is then cut on the end opposite of the head 24B to the proper dimensions. The barbed member 24A of the support member 24 is then placed through an opening in the back of the electrical box 12. The barbs on the barbed member 24A will allow the barbed member 24A to be inserted through the opening in only one direction. The barbed member 24A can be inserted through the opening but will prevent the barbed member 24A from being pulled back out. The barbed member 24A will press up against the, support 26 thereby supporting the electrical box 12 in the wall where the electrical box 12 is installed.

When installing the face plate 20 on the electrical box 12, the barbed member 18A is first inserted through the opening 22 of the face plate 20. The barbs on the barbed member 18A will allow the barbed member 18A to be inserted through the opening 22 in only one direction. The barbed member 18A can be inserted through the opening 22 but will prevent the barbed member 18A from being pulled back out. Thus, the barbed member 18 will be permanently connected to the face plate 20, although it is free to rotate within the opening 22. This will prevent the barbed member 18A from being lost or misplaced when the face plate 20 is removed. The locking member 18C is then coupled to the end of the barbed member 18A.

The barbed member 18A is then inserted into the female receptacle 16. As stated above, the female receptacle 16 may form part of the component in the electrical box 12 or part of the electrical box 12 itself. The locking member 18C may have to be rotated so that the barbed member 18A and the locking member 18C are able to fit into the female receptacle 16.

Figure 4:
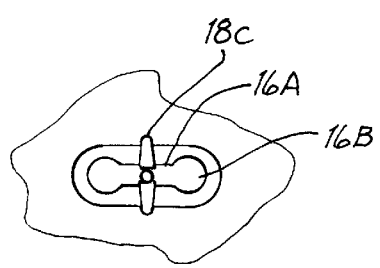
FIG. 4 is a rear view of the locking mechanism used in the face plate locking system of the present invention.

In order to lock the system 10 in place, once the barbed member 18A is inserted into the female receptacle 16, the slotted head 18B is rotated in either a clockwise or counterclockwise direction. In accordance with one embodiment of the present invention, the slotted head 18B only needs to be rotated approximately 90° in either a clockwise or counterclockwise direction. By rotating the slotted head 18B, the locking member 18C will also rotate. As can be seen most clearly in FIG. 4, when the locking member 18C is rotated so that it is in a vertical position, the face plate 20 will be locked into position. By looking at the slotted head 18B, one can tell if the face plate 20 is locked or unlocked. This is due to the fact that the slot in the slotted head 18B is parallel with the barbs of the barbed member 18A and the locking member 18c. Thus, if the slot in the slotted head 18B is vertical, the face plate 20 is locked. If the slot in the slotted head 18B is horizontal, the face plate 20 is unlocked and can be removed.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for locking a face plate to an electrical box comprising, in combination:

a male connector rotatably coupled to the faceplate; and a female receptacle which receives the male connector;

wherein a partial turn of the male connector will lock and unlock the face place to the electrical box, the male connector comprising:

a rod;

barbed members coupled to said rod;

a slotted head coupled to a first end of the rod; and a locking member coupled to a second end opposite of the first end of the rod.

2. A system for locking a face plate to an electrical box in accordance with claim 1 wherein the barbed members are coupled to the rod in an angled position to prevent the male connector from being removed from the face plate once the male connector is placed through an opening in the face plate.

3. A system for locking a face plate to an electrical box in accordance with claim 1 wherein the barbed members, a slot in the slotted head, and the locking member are all parallel to each other.

4. A system for locking a face plate to an electrical box in accordance with claim 1 wherein the female receptacle comprises:

a channeling; and rounded ends on each end of the channeling.

5. A housing for storing electrical components comprising, in combination:
   an electrical box;
   a face plate which is used to cover the electrical box; and
   a locking mechanism for coupling the face plate to the electrical box wherein the locking mechanism uses a partial turn to lock and unlock the locking mechanism, wherein the locking mechanism comprises:
   a rod;
   barbed members coupled to said rod;
   a slotted head coupled to a first end of the rod; and
   a locking member coupled to a second end opposite of the first end of the rod.

6. A housing for storing electrical components in accordance with claim 5 wherein the female receptacle is located on the electrical box.

7. A housing for storing electrical components in accordance with claim 5 wherein the female receptacle is located on a component in the electrical box.

8. A housing for storing electrical components in accordance with claim 5 wherein the barbed members are coupled to the rod in an angled position to prevent the male connector from being removed from the face plate once the male connector is placed through an opening in the face plate.

9. A housing for storing electrical components in accordance with claim 5 wherein the barbed members, a slot in the slotted head, and the locking member are all parallel to each other.

10. A housing for storing electrical components in accordance with claim 5 wherein the female receptacle comprises:
    a channeling; and
    rounded ends on each end of the channeling.

11. A housing for storing electrical components in accordance with claim 5 further comprising a support member coupled to the electrical box for supporting the electrical box against a wall where the electrical box is to be installed.

12. A method for securing a face plate to an electrical box comprising the steps of:
    providing a male connector wherein the male connector comprises:
    a rod;
    barbed members coupled to the rod;
    a slotted head coupled to a first end of the rod; and
    a locking member coupled to a second end opposite of the first end of the rod;
    providing a female receptacle which receives the male connector;
    inserting the male connector through an opening in the face plate wherein the barbed members prevent the male connector from being removed from the opening but allowing the male connector to rotate in the opening;
    inserting the male connector coupled to the face plate in the female receptacle; and
    rotating the slotted head of the male connector.

13. The method of claim 12 further comprising the step of rotating the slotted head of the male connector so a slot in the slotted head is approximately vertical to lock the face plate to the electrical box.

14. The method of claim 12 further comprising the step of rotating the slotted head of the male connector so a slot in the slotted head is approximately horizontal to unlock the face plate to the electrical box.

* * * * *